(12) United States Patent
Nagaoka et al.

(10) Patent No.: US 8,953,840 B2
(45) Date of Patent: Feb. 10, 2015

(54) VEHICLE PERIMETER MONITORING DEVICE

(75) Inventors: Nobuharu Nagaoka, Saitama (JP); Hideki Hashimoto, Saitama (JP); Makoto Aimura, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 309 days.

(21) Appl. No.: 13/579,754

(22) PCT Filed: Feb. 21, 2011

(86) PCT No.: PCT/JP2011/000948
§ 371 (c)(1), (2), (4) Date: Aug. 17, 2012

(87) PCT Pub. No.: WO2011/108217
PCT Pub. Date: Sep. 9, 2011

(65) Prior Publication Data
US 2013/0004021 A1     Jan. 3, 2013

(30) Foreign Application Priority Data

Mar. 1, 2010   (JP) ................................. 2010-044465

(51) Int. Cl.
*G06K 9/00*   (2006.01)
*B60R 1/00*   (2006.01)
(Continued)

(52) U.S. Cl.
CPC . *B60R 1/00* (2013.01); *G06T 5/008* (2013.01); *G08G 1/163* (2013.01);
(Continued)

(58) Field of Classification Search
CPC .......... G06K 9/00791; G06K 9/00825; G06K 9/00369; G06K 9/00805; G06K 9/00362; G06K 9/209; G08G 1/166; G08G 1/16; G08G 1/09623; G08G 1/165; G08G 1/167

USPC ................................... 382/103; 348/148, 143
See application file for complete search history.

(56) References Cited

U.S. PATENT DOCUMENTS 7,672,510 B2 *   3/2010   Nagaoka et al. ............... 382/170
7,741,961 B1 *   6/2010   Rafii et al. ..................... 340/435
(Continued)

FOREIGN PATENT DOCUMENTS

JP       08-305999 A     11/1996
JP    2005-318408 A     11/2005
(Continued)

*Primary Examiner* — Stephen R Koziol
*Assistant Examiner* — Shaghayegh Azima
(74) *Attorney, Agent, or Firm* — Carrier Blackman & Associates, P.C.; Joseph P. Carrier; Anne G. Sabourin

(57) ABSTRACT

An imaging means mounted on a vehicle performs imaging resulting in grayscale images having brightness values corresponding to object temperature, and objects around the vehicle are detected from said images. On the basis of said grayscale images, display images to be displayed on a display device mounted on the vehicle are generated and displayed on the display device. The display images are generated by lowering the brightness of areas not corresponding to the objects detected in the grayscale images. The display device is positioned in the vehicle width direction at no more than a prescribed distance away from an imaginary line passing through the center of rotation of the vehicle steering wheel and extending in the longitudinal direction of the vehicle. Accordingly, because display images are generated in which only the objects are spotlighted, the driver can quickly comprehend the objects present when using a display device.

15 Claims, 9 Drawing Sheets

(51) Int. Cl.
    *G06T 5/00*     (2006.01)
    *G08G 1/16*     (2006.01)
(52) U.S. Cl.
    CPC .... *B60R 2300/105* (2013.01); *B60R 2300/305* (2013.01); *B60R 2300/307* (2013.01); *B60R 2300/8033* (2013.01); *B60R 2300/8093* (2013.01); *G08G 1/165* (2013.01)
    USPC ............................ 382/103; 348/148; 348/143

(56) References Cited

U.S. PATENT DOCUMENTS

| | | | |
|---|---|---|---|
| 7,936,923 B2* | 5/2011 | Liu et al. | 382/173 |
| 2006/0126898 A1 | 6/2006 | Nagaoka et al. | |
| 2007/0165910 A1* | 7/2007 | Nagaoka et al. | 382/104 |
| 2007/0211919 A1* | 9/2007 | Nagaoka et al. | 382/104 |
| 2007/0222566 A1* | 9/2007 | Tsuji et al. | 340/435 |
| 2007/0248245 A1* | 10/2007 | Aimura et al. | 382/104 |
| 2007/0269079 A1* | 11/2007 | Taniguchi et al. | 382/104 |
| 2008/0130954 A1* | 6/2008 | Taniguchi et al. | 382/104 |
| 2009/0066819 A1* | 3/2009 | Ando | 348/254 |
| 2010/0225762 A1* | 9/2010 | Augst | 348/148 |
| 2010/0289632 A1* | 11/2010 | Seder et al. | 340/436 |
| 2011/0001825 A1* | 1/2011 | Hahn | 348/148 |
| 2012/0062743 A1* | 3/2012 | Lynam et al. | 348/148 |

FOREIGN PATENT DOCUMENTS

| | | |
|---|---|---|
| JP | 4334686 B2 | 9/2009 |
| JP | 2010-044561 A | 2/2010 |

* cited by examiner (a)

(b)

(a)

(b)

VEHICLE PERIMETER MONITORING DEVICE

FIELD OF THE ART

The present invention relates to a device for monitoring a surroundings of a vehicle, more specifically, to a device for detecting an object in the surroundings of the vehicle.

BACKGROUND OF THE INVENTION

The patent document 1 below proposes a system, which has a head up display (HUD), detects an object in surroundings of a vehicle by using an IR-camera, highlight displays in a center region of a screen of the head up display one or more objects lying in a region for determining conflicting objects, which is set in a traveling direction of the vehicle, and with icons, displays in right and left area S of the objects lying in an intrusion determination region, which is set in outside of the conflict determination area S.

PRIOR ART DOCUMENT

Patent Document 1: JP patent 4334686 B

SUMMARY OF THE INVENTION

A "head up display" mentioned in the above document is arranged in front of a driver and has an advantage that motion of the eyes is relatively less for a driver to visibly recognize the screen of display. However there are many vehicles that do not have head up displays like this. In contrast, a display device mounted on a dash-board is more commonly used. In particular, the more a navigation device is used, the more a device that displays various kinds of information including map information develops.

Such a display device is arranged not only in front of a driver but also in the left or right sides thereof requiring more movement of the eyes for the driver to visually recognize the display screen. Therefore the image to be displayed on the display device should be easy for the driver to have a quick glance.

Thus, taking into consideration of the use of an ordinary display device as discussed above, a method that enables a driver to quickly recognize an object is needed.

MEANS FOR SOLVING PROBLEMS

According to one aspect of the present invention, a device for monitoring surroundings of a vehicle is provided with;

an imaging device for imaging surroundings of vehicle with one or more cameras mounted on the vehicle, means for acquiring a gray scale image having a intensity corresponding to temperature of the object via imaging with the imaging device, an object detector for detecting a predetermined object existing in the surroundings of the vehicle from the gray scale image, means for generating images to be displayed on a display screen mounted to the vehicle based on the gray scale image, and means for displaying the generated images on the display screen, wherein the display image generating means lowers brightness of the area in the gray scale image other than the area of the detected object to generate the display image.

According to the present invention, brightness is lowered for the region in the gray scale image other than the area for the objects to generate the display image the generated display image is displayed on the display screen. As a result, high-contrast image may be displayed as if a spotlight is focused onto the objects only. Thus, the driver viewing the display screen my quickly recognize existence of the objects.

According to one aspect of the present invention, the display screen is provided at a position where the driver of the vehicle may see, which is apart by a predetermined distance in the width direction from a line passing the center of rotation of steering wheel and extending from the front to the back of the vehicle.

Such a display device is not an HUD which requires less motion of the eyes as mentioned above, and is a regular display device mounted at a left or right side of a steering wheel, which requires relatively large movement of the eye to view the display screen. According to the present invention, the high contrast display image may shorten the time required for a driver to recognize an object, thus, with the use of a regular display device, the driver may quickly recognize the object.

According to one aspect of the present invention, the object detector determines likelihood of conflict between the vehicle and the object, and the display image generating means generates a display image with low brightness in the area except the area of the object, if the likelihood of conflict is determined to be high.

According to the present invention, if the likelihood of conflict between the vehicle and the object is high, then a driver may immediately recognize the object of possible conflict, as a display image having a high contrast is displayed where the object is emphasized as if it is illuminated with a spotlight.

According to one embodiment of the present invention, the display image generating means also overlaps a artificial image of the object over the object in the gray scale image at the position of the object. The display device displays the overlapped image on the display screen.

According to the present invention, as the artificial image is overlapped at a position of the object in the gray scale image with the surroundings of the vehicle, driver's attention may be directed to the position where the artificial image is overlapped to the object. The driver may be prompted to gaze forward as the object image is hidden by the artificial image.

According to one embodiment of the present invention, the display device is a monitor device of a navigation device. According to the present invention, a monitor device of a navigation device may be effectively used to notify a driver of existence of one or more objects lying in the surroundings of the vehicle.

Other characteristics and advantages of the present invention will be apparent from following detailed explanation.

BRIEF OF DESCRIPTION OF DRAWINGS

DETAILED DESCRIPTION OF THE EMBODIMENTS

Figure 1:
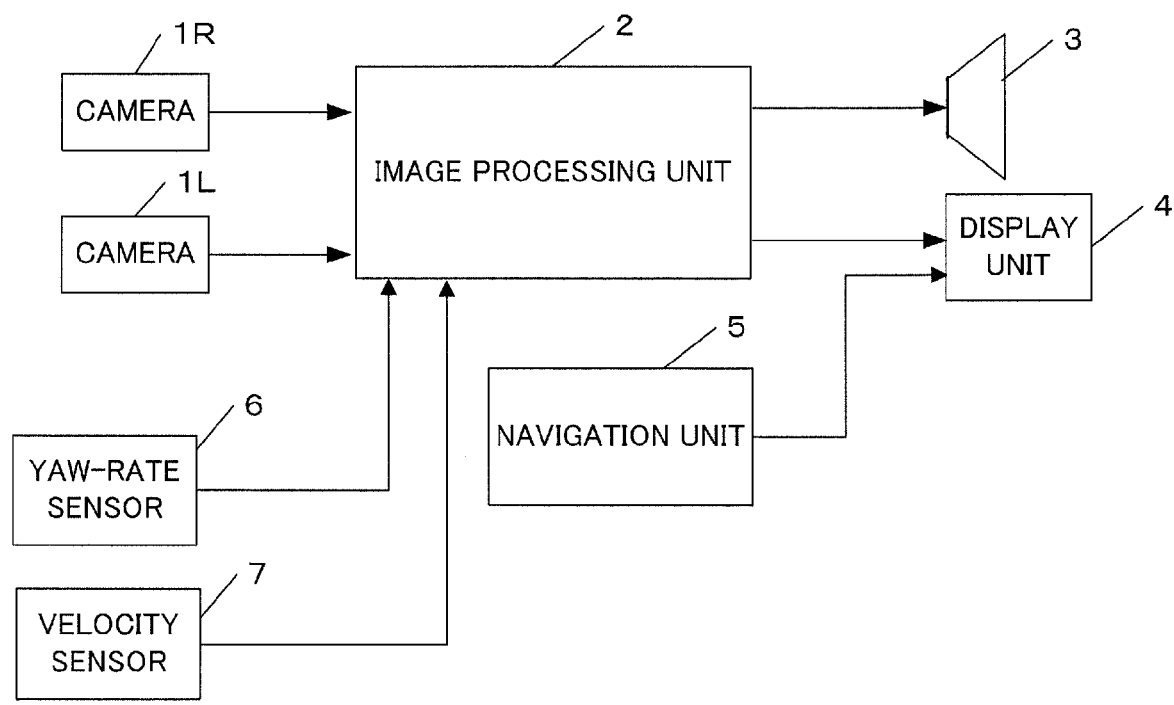
FIG. 1 is a block diagram illustrating a configuration of the monitor device according to an embodiment of the present invention.
Figure 2:
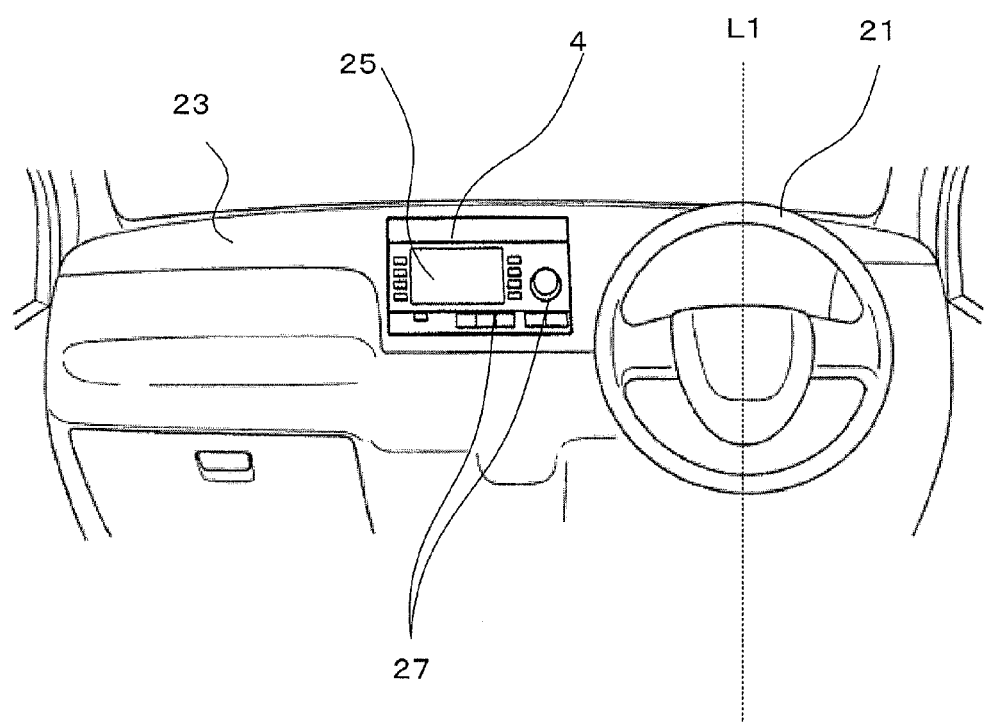
FIG. 2 is illustrates positions where the display device and the camera are mounted.
Figure 2:
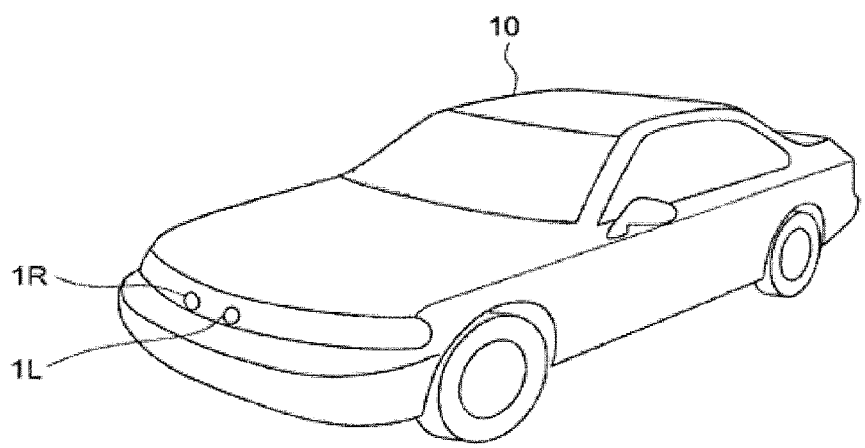

Now, referring to the drawings, embodiments of the present invention will be described. FIG. 1 is a block diagram showing a configuration of the monitor device. FIG. 2 illustrates a display device and a camera mounted to a vehicle.

The vehicle is provided with a navigation device. The navigation device comprises a navigation unit 5 and a monitor or a display device 4. The display device 4 is mounted on a position where a driver may visibly recognize an object and is arranged at a position apart a predetermined distance from a line L1 extending through a center of handle (steering wheel) of the vehicle and extending from the front to the back of the vehicle, as shown in FIG. 2 (a). In this embodiment, the monitor 4 is arranged in a dashboard 23 of the vehicle.

The navigation unit 5 comprises a computer including a central processing unit (CPU) and memories. The navigation unit 5 receives, via a communication device provided in the navigation unit 5, GPS signal for measuring the position of the vehicle 10 via an artificial satellite and detects a current position of the vehicle 10. The navigation unit 5 may overlap map information for the surroundings of the vehicle to the image of current position and may display the overlapped image onto a display screen 25 of the display device 4 (The map information may be stored in a storage device of the navigation device or may be received from a server via the communication device). Further, the display screen 25 of the monitor 4 may comprise a touch panel, with which or with an input device 27 such as keys and buttons, a user may enter a destination into the navigation unit 5. The navigation unit 5 calculates an optimum path to reach the destination of the vehicle, and may overlap the image showing the optimum path to the map information for display on the monitor screen 25 of the monitor 4.

Further, a recent navigation device is provided with various functions including a provision of traffic information and a guidance about facilities near the vehicle. In this embodiment, any proper navigation device may be used.

The device for monitoring the surroundings is mounted to the vehicle and includes two infrared cameras 1R and 1L capable of detecting far infrared ray. The device also includes an image processing unit 2 for detecting an object in the surroundings of the vehicle based on image data captured by the cameras 1R and 1L, and a speaker 3 for generating an alarm by sound or voice. The monitor (display device) 4 not only displays an image obtained from the image captured by the cameras 1R and 1L, but also provides display that makes the driver recognize existence of one or more objects in the surroundings of the vehicle. Further the monitoring device includes a yaw-rate sensor 6 that detects a yaw-rate of the vehicle and a car velocity sensor 7 that detects velocity (speed) of the vehicle. The results from these sensors are transmitted to the image processing unit 2.

In this embodiment, as shown in FIG. 2(b), the cameras 1R and 1L are arranged in the front portion of the vehicle body 10 symmetrically relative to the central axis extending from the center of width of the vehicle in order to capture images in front of the vehicle 10. Two cameras 1R and 1L are fixed to the vehicle such that the optical axes of the cameras are mutually parallel and with the same height from the road surface. The IR cameras 1R and 1L have characteristics that the higher the temperature of the object is, the higher becomes the level of output signals of both cameras (that is, higher brightness in the captured image).

The image processing unit 2 is provided with an A/D conversion circuit which converts an input analog signal into a digital signal, an image memory for storing a digitalized image signal, a center processing unit (CPU) for carrying out each of calculation processes, a RAM (random access memory) used for storing data for operation by the CPU, a ROM (read only memory) for storing programs and data (including tables and maps) to be executed or processed by the CPU, and an output circuit for providing signals such as for driving the speaker 3 and for driving the monitor (display device) 4. The output signals from the cameras 1R and 1L are converted into digital signals and provided to the CPU.

Likewise, in this embodiment, the monitor 4 of the navigation device is used for displaying images captured with the cameras 1R and 1L and for displaying notices (alarm) to the driver indicating presence or non-presence of one or more objects. As mentioned above, unlike a head up display (HUD) arranged to display a screen on a front window in front of the driver, the monitor 4 is arranged at a position apart from the handle 21 by a predetermined distance in the width direction so that a larger motion of the eyes is needed for the driver to visually recognize the screen of the monitor 4 and thus a longer time is needed for visual recognition. Thus, for easy recognition of the objects by the driver via the monitor 4, the manner of display on the monitor should be easy to recognize, that is, the display should be recognizable by the driver in a shorter time than with the HUD. The present invention facilitates display in such a manner, that is, display is produced as if the object in the image is illuminated with a spotlight.

Figure 3:
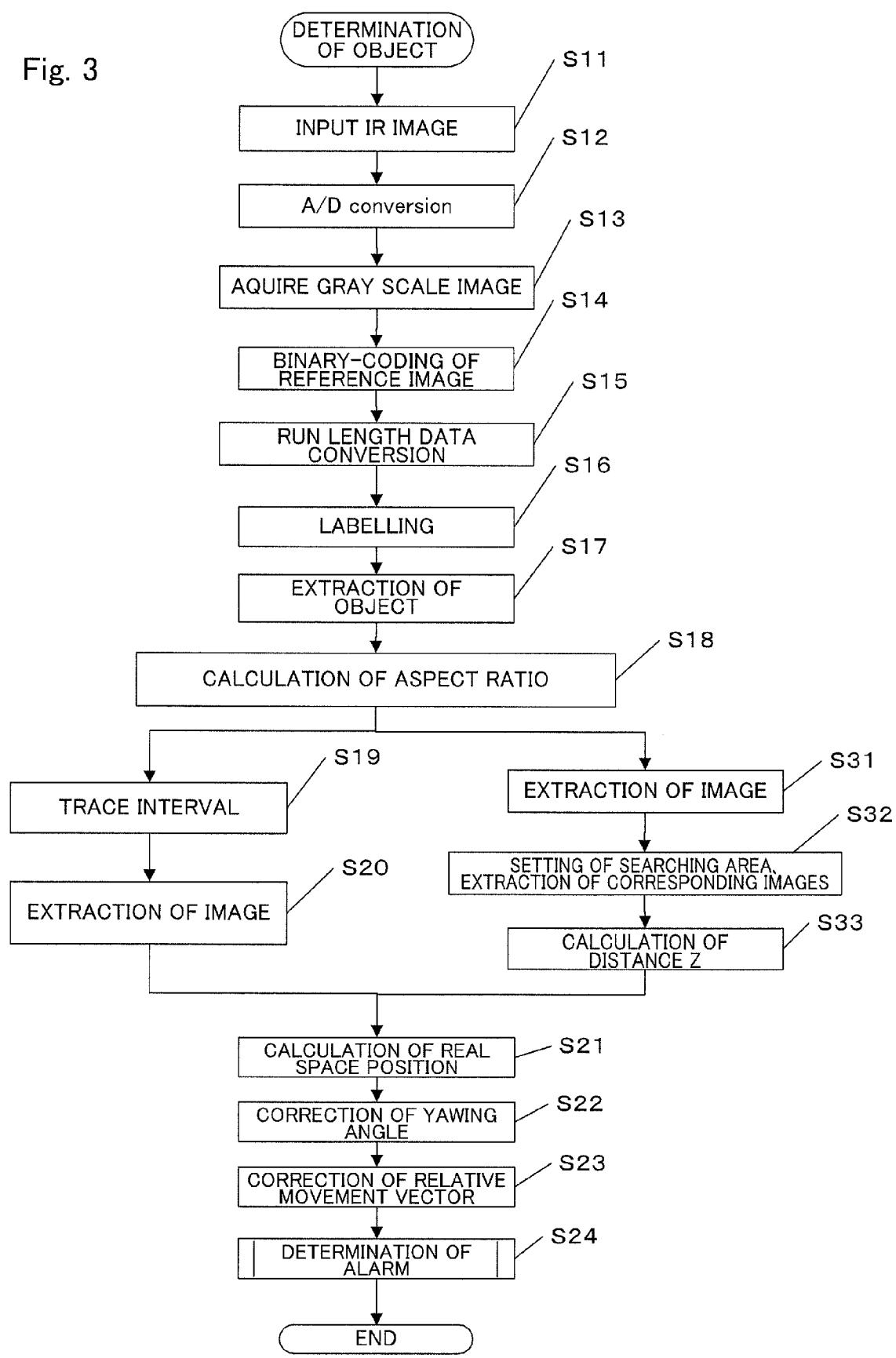
FIG. 3 is a flowchart showing a process in an image processing unit according to an embodiment of the present invention.

FIG. 3 is a flowchart showing a process performed by the image processing unit 2. The process is carried out at a predetermined time interval. As steps of S11 to S13 are described in detail in JP2001-6096A, these steps will be described briefly.

In steps of S11 to S13, output signals from the cameras 1R and 1L (the captured image data) are received as input signals, which are A/D-converted, and are stored into the image memory. The stored image data are gray scale images including brightness information.

At a step S14, right image captured by the camera 1R is defined as a reference image (alternatively, left image may also be defined as a reference image) and the image signal of the reference image is binary-coded. Specifically, a region having a value higher than a brightness threshold value is given 1 (white) while a region having a value darker than the brightness threshold value is given 0 (black). By using this binary-coding, an object such as a living body whose temperature is higher than a predetermined temperature, is extracted as a white region. A brightness (intensity) threshold value ITH may be determined with any proper method.

At step S15, the binary-coded image data are converted into run-length data. Specifically, the run-length data are defined by the coordinate of a starting point (left-end pixel of each line) of the white region (called "line") of each line of pixels and a length (defined by a number of pixels) from the starting point to the end point (the right-end pixel of each line). Here, y-axis is in a vertical direction of the image and x-axis is in a horizontal direction. In the embodiment, if a white region in a line of pixels whose y coordinate is y1 belongs to a line from (x1, y1) to (x3, y1), this line consists of three pixels and is represented by run-length data (x1, y1, 3).

At Step S16 and S17, labeling of an object is performed and the object is extracted. Specifically, out of the run-length coded lines, lines overlapping in the y-direction are combined to represent a single object, and a label is given to the single object. Thus, singular or plural objects are extracted.

At step S18, gravity G, area (acreage) S and an aspect ratio of the extracted object are calculated. The aspect ratio (ASPECT) is the ratio of the vertical length to the horizontal length of a rectangle circumscribing the object. The area S is calculated by integration of the lengths of run-length data of the same object. The coordinate of the center of gravity G is calculated by determining the x coordinate of the line dividing the area into equal parts in the x direction and the y coordinate of the line dividing the area into equal parts in the y direction. ASPECT (aspect ratio) is calculated as the ratio of Dy to Dx, or Dy/Dx, Dy and Dx respectively being the length in y-direction and x-direction of the circumscribing rectangle. The center of gravity of the circumscribing rectangle may be used as the center of gravity of the circumscribing rectangle At step S19, temporal tracking of the object (tracking) is performed, that is, the same object is recognized in a predetermined sampling cycle period. The sampling cycle period may be the same as the period when a process in FIG. 3 is performed. Specifically, an object A is extracted at a time k that is a discrete time given by sampling an analog time t with the sampling cycle period. Then, determination is performed as to whether the object B extracted at time (k+1), the next sampling time, is the same as the object A. This determination may be carried out according to a predetermined condition. For example, the objects A and B are determined to be the same if 1) difference between the coordinates (x, y) of the center of gravities for the respective objects A and B is smaller than a predetermined allowance, 2) the ratio of the area of the image of object B to that of the object A is smaller than a predetermined allowance, and 3) the ratio of the aspect ratio of the circumscribing rectangle of the object B to that of the object A is smaller than a predetermined allowance.

Thus, in each sampling period, the position of the object (a coordinate of the center of gravity G in this embodiment) is stored in a memory as temporal data along with the assigned label.

The above-mentioned process of steps S14 to S19 is carried out for the binary-coded reference image (right image in the embodiment).

In step S20, a vehicle velocity VCAR detected by a vehicle velocity sensor 7 and yaw-rates YR detected by a yaw rate sensor 6 are read, and the yaw angle θr of the vehicle is calculated by temporally integrating the yaw-rates YR.

On the other hand, at steps S11 to S33, together with processes of steps S19 and S20, a distance z from the vehicle 10 to the object is calculated. This calculation takes a longer time than steps S19 and S20 so that the calculation may be carried out at a longer cycle period than for steps S19 and S20 (for example, three times longer than the period for steps S11 to S20).

At step S31, one of the objects to be tracked with the binary-coded images of the reference image (in this embodiment, right image) is selected as a searching image R1 (here, the image region in a circumscribing rectangle is the searching image). At step S32, the same image as the searching image R1 is searched in left image, the same image being called a corresponding image. Specifically, such a process may be performed by performing a correlation calculation between the searching image R1 and the left image. The correlation calculation is carried out according to following equation (1). This correlation calculation is carried out using a gray scale image, not the binary-coded image.

[Equation 1]

$$C(a, b) = \sum_{n=0}^{N-1} \sum_{m=0}^{M-1} |IL(a+m-M, b+n-N) - IR(m, n)| \quad (1)$$

Here, the searching image R1 has M×N pixels. IR (m, n) is a brightness (intensity) value of the position of coordinate (m, n) in the searching image R1. IL (a+m−M, b+n−N) is a intensity of the position of coordinate (m, n) in a local region of the same shape as the searching image R1. The position of the corresponding image is determined by altering the coordinate (a, b) of the reference point and determining the position where the sum C (a, b) of differences of brightness is smallest.

Alternatively, a region to be searched may be preset in the left image, and a correlation calculation may be carried out between the searching image R1 and the preset region.

In step 33, distance dR between the position of the center of gravity for searching image R1 and a central line LCTR of the captured image (the line dividing the captured image into two equal sections in X-direction) and distance dL between the position of the center of gravity of the corresponding image and a central line LCTR of the captured image are determined, and distance z to the object from vehicle 10 is calculated with the following equation (2).

[Equation 2]

$$z = \frac{B \times F}{(dL + dR) \times p} = \frac{B \times F}{\Delta d \times p} \quad (2)$$

Here, B is a base-line length, that is, a distance in x-direction (horizontal direction) between the central position of an imaging element of camera 1R and the central position an imaging element of camera 1L. F is a focal point of respective lenses of cameras 1R and 1L. P is a pixel interval of the imaging elements of the camera 1R and 1L. Δd (=dR+dL) is parallax.

Figure 4:
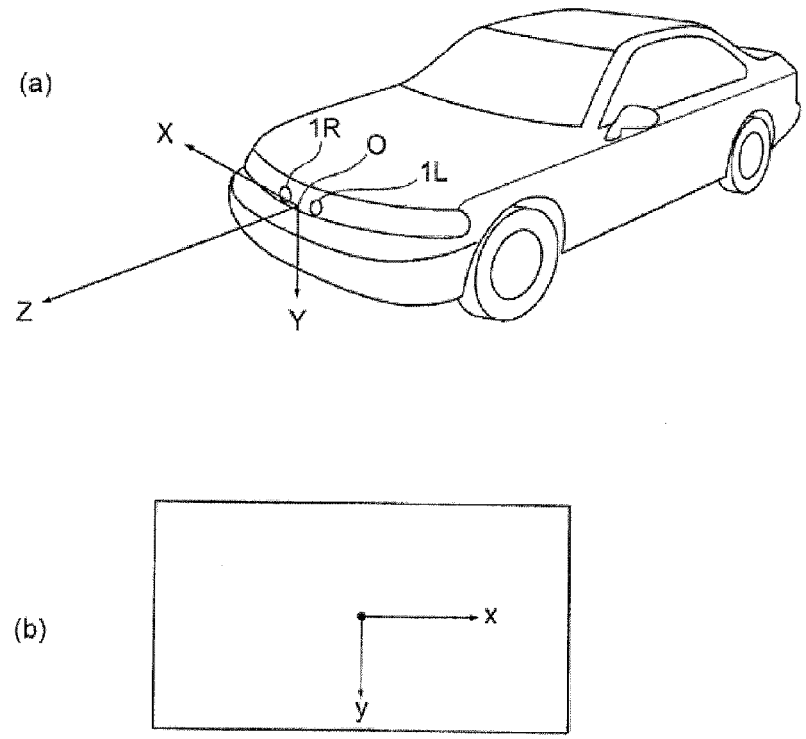
FIG. 4 is a drawing for showing a coordinate system of a real space and a coordinate system of an image according an embodiment of the present invention.

In step S21, a distance Z that is calculated in accordance with coordinate (x,y) of the position of the object (the position of the center of gravity G) in the image of object and equation (2) is applied to equation (3) to convert into a real space coordinate (X,Y,Z). Here, the real space coordinate (X,Y,Z) is expressed by the coordinate-system as shown in FIG. 4(*a*) with the origin point O being the position of the middle point of mounting positions of cameras 1R and 1L, and with the X axis being the direction of width of vehicle 10, Y axis being the direction of height of vehicle 10, and Z axis being the direction of movement of vehicle 10. As shown in FIG. 4(*b*), the coordinate on the image is expressed using a coordinate-system with the origin point being the center of the image, x axis being the horizontal direction and y axis being the vertical direction.

[Equation 3]

$$\begin{bmatrix} X \\ Y \\ Z \end{bmatrix} = \begin{bmatrix} xc \times z/f \\ yc \times z/f \\ z \end{bmatrix} \quad (3)$$

$$f = F/p$$

Here, on the basis of relative positional relation between a mounting position for camera 1R and the origin point of the real space coordinate system, coordinate (x, y) on the right image is converted into a coordinate (xc, yc) in a virtual image whose center is positioned at the origin point O of the real space. f is a ratio of a focal distance to a pixel interval p.

In step S22, in order to correct a positional deviation caused on the image by yawing of vehicle 10, the yawing angle is corrected. In a period form time k to time (k+1), if the vehicle 10, for example, yaws by a yawing angle θr in the left direction, then in an image captured by the camera the vehicle 10 deviates Δx in x-direction (positive direction). The deviation needs to be corrected.

Specifically, the real space coordinate (X, Y, Z) is applied to equation (4) below to calculate a corrected coordinate (Xr, Yr, Zr). The calculated real space position datum (Xr, Yr, Zr) in association with each object is stored into a memory temporally. Note that the coordinates after correction are expressed by (X, Y, Z).

[Equation 4]

$$\begin{bmatrix} Xr \\ Yr \\ Zr \end{bmatrix} = \begin{bmatrix} \cos\theta r & 0 & -\sin\theta r \\ 0 & 1 & 0 \\ \sin\theta r & 0 & \cos\theta r \end{bmatrix} \begin{bmatrix} X \\ Y \\ Z \end{bmatrix} \quad (4)$$

In step S23, from N real space position data (for example, N=10 or so) after correction of yaw angle obtained in period ΔT for the same object, that is, from temporal data, an approximate straight line LMV corresponding to a relative movement vector of the object relative to the vehicle 10 is obtained. Specifically, suppose a direction vector pointing to the direction of the approximate straight line LMV is given by L=(lx, ly, lz) (|L|=1), then the straight line is obtained by equations (5) below.

[Equation 5]

$$X = u \cdot lx + Xav \quad (5)$$
$$Y = u \cdot ly + Yav$$
$$Z = u \cdot lz + Zav$$
$$Xav = \sum_{j=0}^{N-1} X(j)/N$$
$$Yav = \sum_{j=0}^{N-1} Y(j)/N$$
$$Zav = \sum_{j=0}^{N-1} Z(j)/N$$

u is a parameter which may assume an arbitrary value. Xav, Yav, and Zav respectively are average value of x-coordinates, average value of y-coordinates, and average value of z-coordinates of a series of real space position data. The parameter u is deleted from the equations (5) to produce equation (5a) below.

$$(X-Xav)/lx = (Y-Yav)/ly = (Z-Zav)/lz \quad (5a)$$

Figure 5:
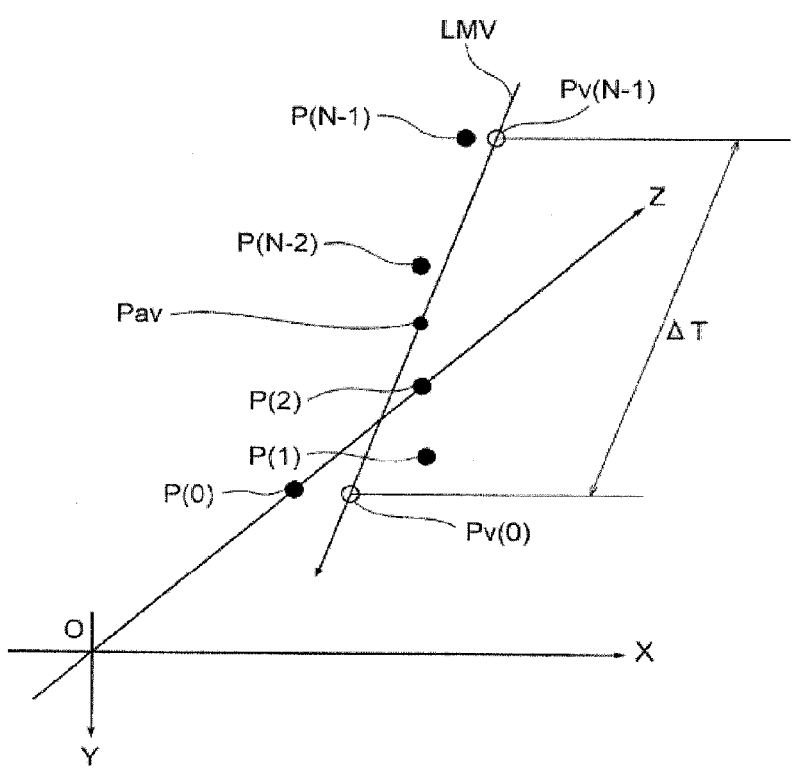
FIG. 5 is a drawing illustrating method of calculating a relative motion vector according to an embodiment of the present invention.

FIG. 5 is illustrates the approximate straight line LMV. P(0), P(1), P(2), . . . , P(N-2), P(N-1) are temporal data after correction of the yawing angle. The approximate straight line LMV is obtained as a line which passes through the coordinate Pav of the average position of the temporal data (=(Xav, Yav, Zav)), and the average value of square of the distances from each data point to the line is smallest. The value in the parentheses ( ) of P indicates discrete past time. For example, P(0) corresponds to a latest positional coordinate, P(1) corresponds to a coordinate one sampling cycle before, and P(2) corresponds to a positional coordinate two sampling cycle before. The same is true for X(i), Y(i), and Z(j) that appear below. Note that a more details of calculating the approximate straight line LMV is disclosed in Japanese Patent Application Publication No. 2001-6096.

Next, the latest positional coordinate P(0)=(X(0), Y(0), Z(0)) and positional coordinate of (N-1) before (that is, ΔT time before), P(N-1)=(X(N-1)), Y(N-1), Z(N-1)) are corrected to a position on the approximate straight line LMV. Specifically, Z-coordinates of Z(0) and Z(n-1) are applied to the equation (5a) to obtain equation (6), which gives corrected positional coordinates Pv(0)=(Xv(0), Yv(0), Zv(0)) and Pv(N-1)=(Xv(N-1), Yv(N-1), Zv(N-1)).

[Equation 6]

$$Xv(j) = (Z(j) - Zav) \times \frac{lx}{lz} + Xav \quad (6)$$

$$Yv(j) = (Z(j) - Zav) \times \frac{ly}{lz} + Yav$$

$$Zv(j) = Z(j)$$

$$j = 0, N-1$$

A vector directed to Pv(0) from the positional coordinate Pv(N-1) calculated according to equation (6) is calculated as a relative movement vector.

This way, from plural (N) data in monitor period ΔT, the approximate straight line LMV that approximates relative movement trace of the object relative to vehicle 10 is calculated to determine the relative movement vector. Thus, influence of positional detection errors is reduced and possibility of collision with the object may be more adequately anticipated.

Figure 6:
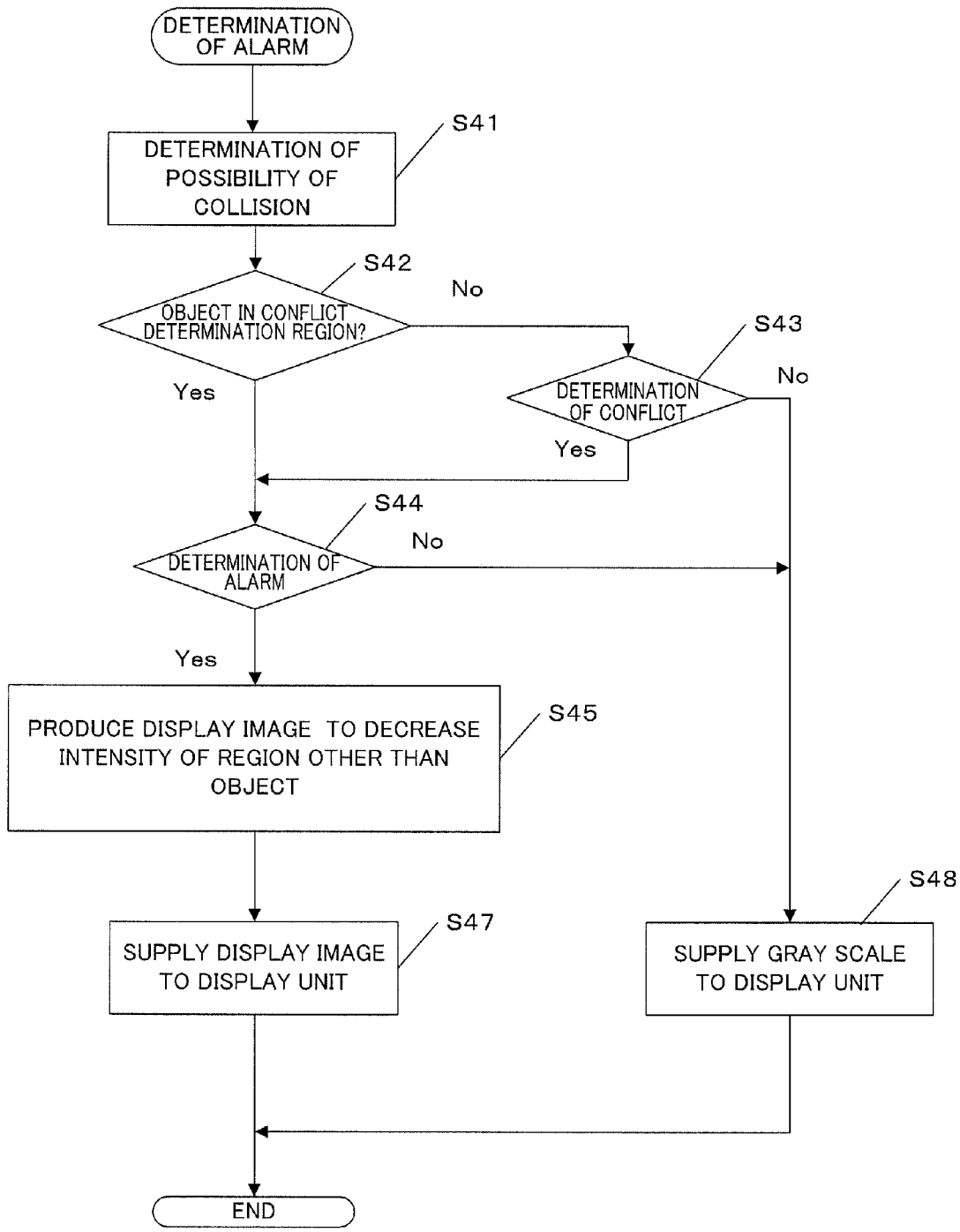
FIG. 6 is a flowchart showing an alarm decision process according to an embodiment of the present invention.
Figure 7:
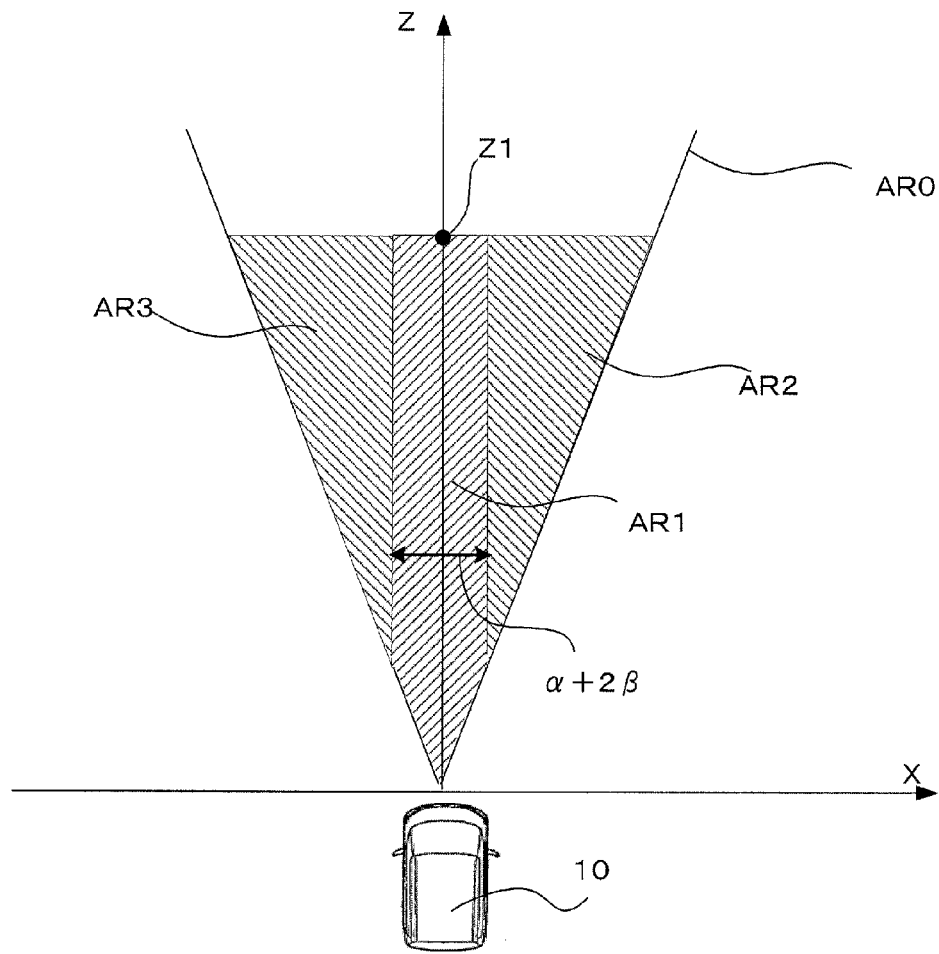
FIG. 7 is a flowchart showing a region where an image segment is captured in front of a vehicle and a segment of each of the area S.

In step S24, an alarm decision process is carried out. FIG. 6 shows the alarm decision process. This process will be described, referring to FIG. 7. In FIG. 7, an imaging region ARO is a region that can be captured by the camera 1R, 1L. The steps S1 to S23 in FIG. 23 are carried out for captured images in the imaging region ARO.

A region AR1 corresponds to the width a of the vehicle plus allowance β (for example, 50 to 100 cm) for both sides of the vehicle, that is, AR1 is a region having a width of (α/2+β) in both sides with respect to the central axis of the width of vehicle 10. AR1 is a region where likelihood of a collision is high if an object remains in this region, which is called a conflict determination region. Regions AR2 and AR3 have larger X coordinate values (horizontally outside the conflict determination region) than the conflict determination region.

Regions AR2 and AR3 are called intrusion determining regions where objects lying in the regions are likely to enter the conflict determination region. These regions AR1 to AR3 have a predetermined height H in the Y direction and have a predetermined distance Z1 in the Z direction.

Now, in FIG. 6, step S41, likelihood of collision is determined for each object. Specifically, objects lying in regions AR1 to AR3 are extracted. For this purpose, relative velocity Vs of each object in Z direction relative to the vehicle is calculated in accordance with equation (7). Then, objects that satisfy equations (8) and (9) are extracted.

$$Vs=(Zv(N-1)-Zv(0))/\Delta T \quad (7)$$

$$Zv(0)/Vs \leq T \quad (8)$$

$$|Yv(0)| \leq H \quad (9)$$

Here, Zv(0) is the latest distance detection value (v indicates that data is corrected according to the approximate straight line LMV, Z coordinate being the same as before correction), and Zv(N-1) is a distance detection value for time $\Delta T$ before. T is an allowance time for determining a likelihood of collision time T before an anticipated collision time. T is, for example, two to five seconds. Vs×T corresponds to the distance Z1 of the above mentioned areas AR1 to AR3. H defines a region in Y direction or height direction, which is for example two times the height of vehicle 10. This is the height H of the above mentioned areas AR1-AR3. Thus, the objects in the areas AR1-AR3 that are limited by the height H in the vertical direction and by the distance Z1 in the distance direction are determined to be of possible collision and are extracted.

Next, in step S42, for each of thus extracted objects, an conflict determination process is carried out to determine if each object is within the conflict determination area AR1. Specifically, determination is carried out as to whether X-coordinate Xv(O) of position Pv(O) of each object is within the AR1. The object of affirmative (Yes) determination is determined to include a high possibility of collision and the process proceeds to step S44. The object of negative (No) determination is determined to be in area AR2 or AR3, and the process proceeds to step S43 of intrusion determination process.

In the intrusion determination process, the difference between the latest x coordinate xc(O) of the object on the image (c indicates that the coordinate is corrected such that the center of image lies on the origin point O of the real space) and the x-coordinate xc for time $\Delta T$ before is checked to see if it satisfies equation (10). The object that satisfies equation (10) is determined to include a high possibility of collision with vehicle 10 by moving into the conflict determination area AR1 (in S43, "Yes"), and the process proceeds to step S44. If no objects satisfies the equation (10), it is determined that no objects are in the regions AR1-AR3 that have a possibility of collision with vehicle 10 (S43, "No"), and the process proceeds to step S48. In step S48, a regular displaying of a gray scale image acquired in step S13 is performed on display device 4.

[Equation 7]

$$\frac{-\alpha \cdot f}{2}\left(\frac{1}{Zv(0)} - \frac{1}{Zv(N-1)}\right) \leq \quad (10)$$
$$xc(0) - xc(N-1) \leq \frac{\alpha \cdot f}{2}\left(\frac{1}{Zv(0)} - \frac{1}{Zv(N-1)}\right)$$

Figure 8:
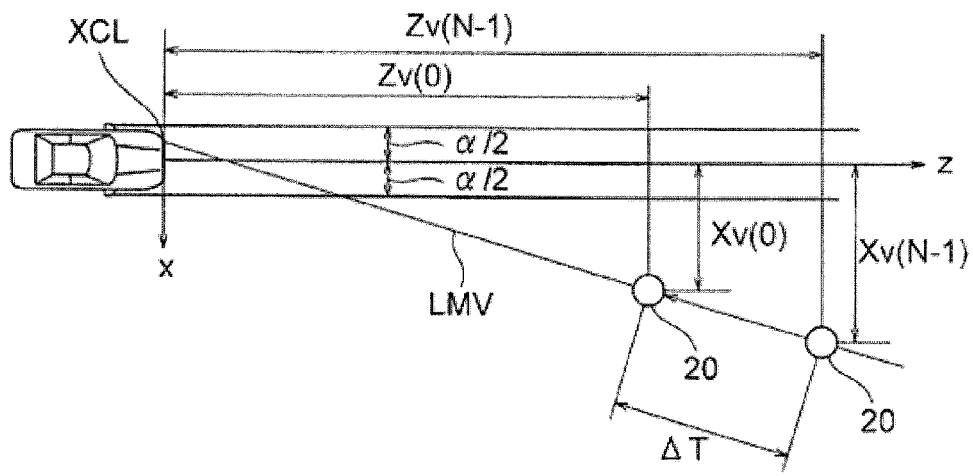
FIG. 8 is a drawing illustrating an intrusion determination process according to an embodiment of the present invention.

Here, the basis of equation (10) will be briefly described. Referring to FIG. 8, the approximate straight line LMV is a line that passes the latest positional coordinate of object 20 and the positional coordinate of time $\Delta T$ before. The X coordinate XCL is the point of intersection of the line LMV with the XY plane (the plane of X axis and Y axis, that is the plane including X axis that is the line of the front end of vehicle 10 and is vertical relative to the direction of travel movement of vehicle 10). The condition of collision may be expressed by equation (11) taking into consideration of vehicle width α.

$$-\alpha/2 \leq XCL \leq \alpha/2$$

On the other hand, a straight line formed by projecting the approximate straight line LMV onto XZ-plane is given by equation (12).

[Equation 8]

$$Z - Zv(0) = \frac{Zv(N-1) - Zv(0)}{Xv(N-1) - Xv(0)} \times (X - Xv(0)) \quad (12)$$

Z=0 and X=XCL are entered to this equation to obtain XCL as expressed by equation (13).

[Equation 9]

$$XCL = \frac{Xv(0)/Zv(0) - Xv(N-1)/Zv(N-1)}{1/Zv(0) - 1/Zv(N-1)} \quad (13)$$

Further, there is a relationship as expressed by equation (3) between the real space coordinate X and the coordinate xc of the image so that following equations are established.

$$Xv(0)=xc(0) \times Zv(0)/f \quad (14)$$

$$Xv(N-1)=xc(N-1) \times Zv(N-1)/f \quad (15)$$

These equations are applied to equation (13) to obtain an intersection point X coordinate XCL given by equation (16). This equation is applied to equation (11) and the above-mentioned equation (10) is obtained. Note that Japanese Patent Application Publication No. 2001-6096 describes a more details of intrusion determination process.

[Equation 10]

$$XCL = \frac{xc(0)/f - xc(N-1)/f}{1/Zv(0) - 1/Zv(N-1)} \quad (16)$$

Returning to FIG. 6, in step S44, for the object that has been determined to include a high possibility of collision in the above-mentioned conflict determination process and intrusion determination process, an alarm determination process is performed to determine if an alarm to the driver should be produced.

In this embodiment, the alarm determination process determines if an alarm should be produced in view of braking operation. Specifically, based on output of a brake sensor (not shown), braking operation of the driver of vehicle 10 is detected. If no braking operation is detected, an alarm should be produced ("Yes" at S44) and the process proceeds to step S45.

If a braking operation is performed, an acceleration Gs produced thereby (positive value for deceleration) is calculated. A threshold value GTH for each object is calculated according to equation (17). If there is at least one object whose acceleration Gs is not larger than the threshold GTH (Gs≤GTH), then it is determined that an alarm should be produced ("Yes" at S44) and the process proceeds to S45.

If there is no object that satisfies the relation of Gs☐GTH, it is assumed that a collision may be avoided by braking operation, and the process proceeds to step S48, where as mentioned above a regular displaying of the gray scale image on the display device 5 is performed without outputting an alarm. Equation (17) gives a value for GTH that corresponds to a condition that vehicle 10 stops within a distance shorter than distance Zv(0) when a braking acceleration Gs is maintained as it is.

[Equation 11]

$$GTH = \frac{V_S^2}{2 \times Zv(0)} \qquad (17)$$

By carrying out the alarm determination process, when a proper brake operation is performed, no alarm will be produced so that the driver may not be bothered. On the other hand, alternatively, without carrying out the alarm determination process, the process may proceed to step S45 responsive to existence of at least one object that has been determined to include a high possibility of collision.

In step S45, the region in the gray scale image acquired by step S13 except for the regions corresponding to the object or objects that are determined to include high possibility of collision in the steps S41-S43 is reduced in intensity (brightness).

Figure 9:
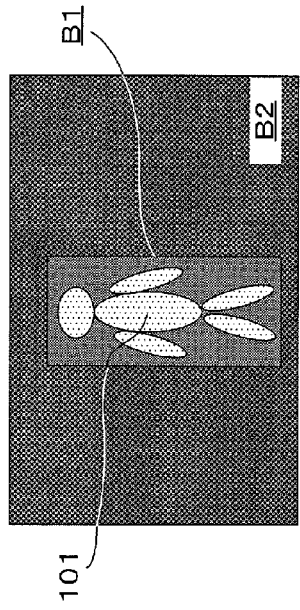
FIG. 9 is a drawing illustrating generation of a display image according to an embodiment of the present invention.
Figure 9:
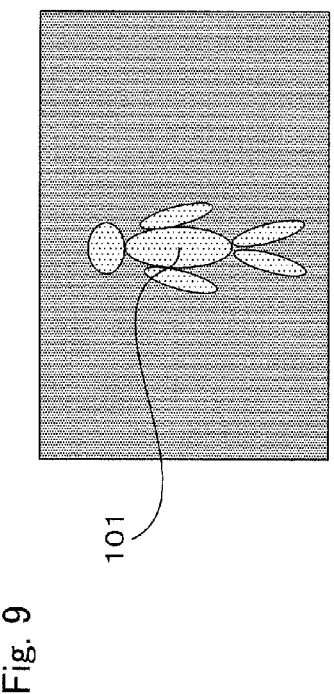

FIG. 9(*a*) illustrates a gray scale image, which is captured via infrared camera 1R and 1L in step S13. An object 101 (a pedestrian in this example) is assumed to be an object that is determined to include a high possibility of collision as mentioned above. For the purpose of clarification, in this example, the intensity of the object 101 is I1, while the intensity of the regions except for the region of object 101 is I2.

In step S45, as shown in FIG. 9 (*b*), a display image whose intensity is decreased in whole region B2 except for region B1 that includes the object (for example, a rectangular region circumscribing the object as set in step S18, FIG. 3). In this example, the intensity of all pixels in region B2 including the object is maintained as it is (thus, the intensity of the image of the object 101 is held I1), the intensity of all pixels in region B2 is decreased from I2 to I3 by a predetermined amount. In step S47, the image thus produced is displayed on display unit 4.

As can be seen in FIG. 9 (*b*), the intensity of region B2 other than object region B1 is decreased so that pedestrian 101 in the object region B1 is seen as if it is spotlighted. Thus, as compared with FIG. 9 (*a*), a high contrast image highlighting only the pedestrian is produced.

Figure 10:
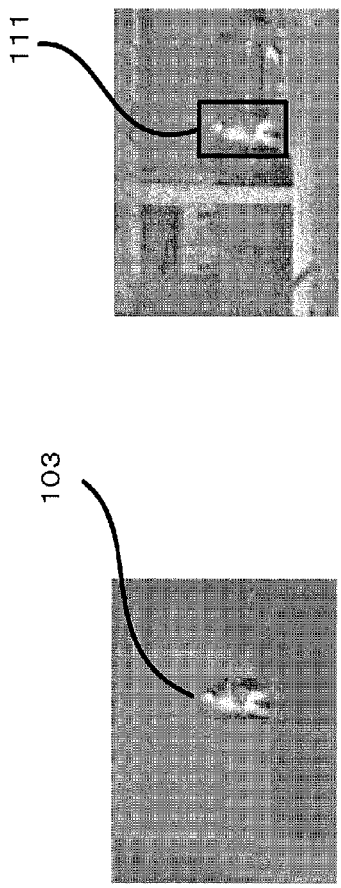
FIG. 10 is a drawing of illustrating a display image according to an embodiment of the present invention.
Figure 10:
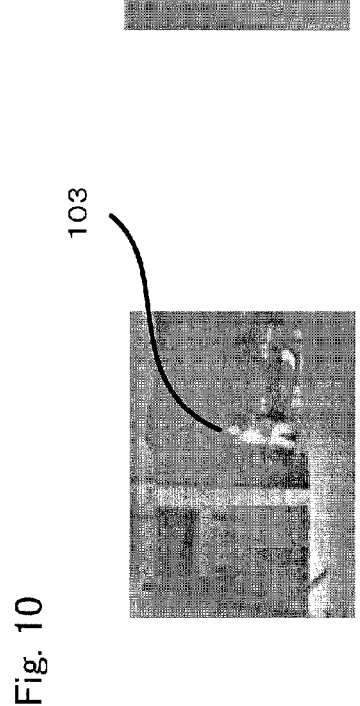

FIG. 10 illustrates as an example, (a) a gray scale image actually acquired, and (b) display image produced by the process of step S45. In the gray scale image, an image of a pedestrian 103 is captured. It is assumed that the pedestrian 103 is an object determined to include a high possibility of collision as mentioned above.

In FIG. 10 (*b*), the intensity of the region other than the region surrounding the pedestrian 103 is decreased. Therefore, in contrast to FIG. 10 (*a*), pedestrian 103 may easily and quickly be recognized. For comparison, FIG. 10 (*c*) shows a conventional alarm mode in which an object in the gray scale image is emphasized by a frame 111. In FIG. 10 (*c*), various items other than the pedestrian 103 are included in the gray scale image so that even if the pedestrian is highlighted, the driver may hardly find where to focus quickly.

Particularly, when display device 4 is placed apart in the car-width direction from the steering wheel, an image such as shown in FIG. 10 (*c*) may cause a delay for the driver to recognize the object. According to the present invention, as shown in FIG. 10 (*b*), items other than the pedestrian 103 are made dark and only pedestrian 103 is displayed in a mode as if it is spotlighted, enabling quicker recognition of the pedestrian 103 than the case of FIG. 10 (*c*).

In the example of FIG. 10, the intensity of the region other than the region surrounding the object is decreased. Alternatively, intensity of the region other than the object may be decreased without setting a region surrounding the object. Further, in the above example, intensity of the pixels are decreased by a predetermined amount for decreasing the intensity of the region other than the object (or a region surrounding the object). Alternatively, intensity of all the pixels of the object (or a region surrounding the object) may be changed to a predetermined small (for example, black-value or near black-value).

Additionally, an alarm sound may be output by way of speaker 3 while the display image in step S47 is provided to display unit 4. The alarm sound may be any sound, and may be a sound such as buzzer or a vocal message.

In this embodiment, in steps S41 to S43, the intensity of the display image for the object that is determined to include a high possibility of collision is maintained as it is. Alternatively, when a braking operation is detected in the alarm determination process in step S44, for the object that is determined to include a high possibility of collision and that satisfies Gs≤GTH in the alarm determination process in step S44, the intensity for the object in the display image may be maintained. Thus, one or more objects needing driver's attention only may be recognized by the driver.

Figure 11:
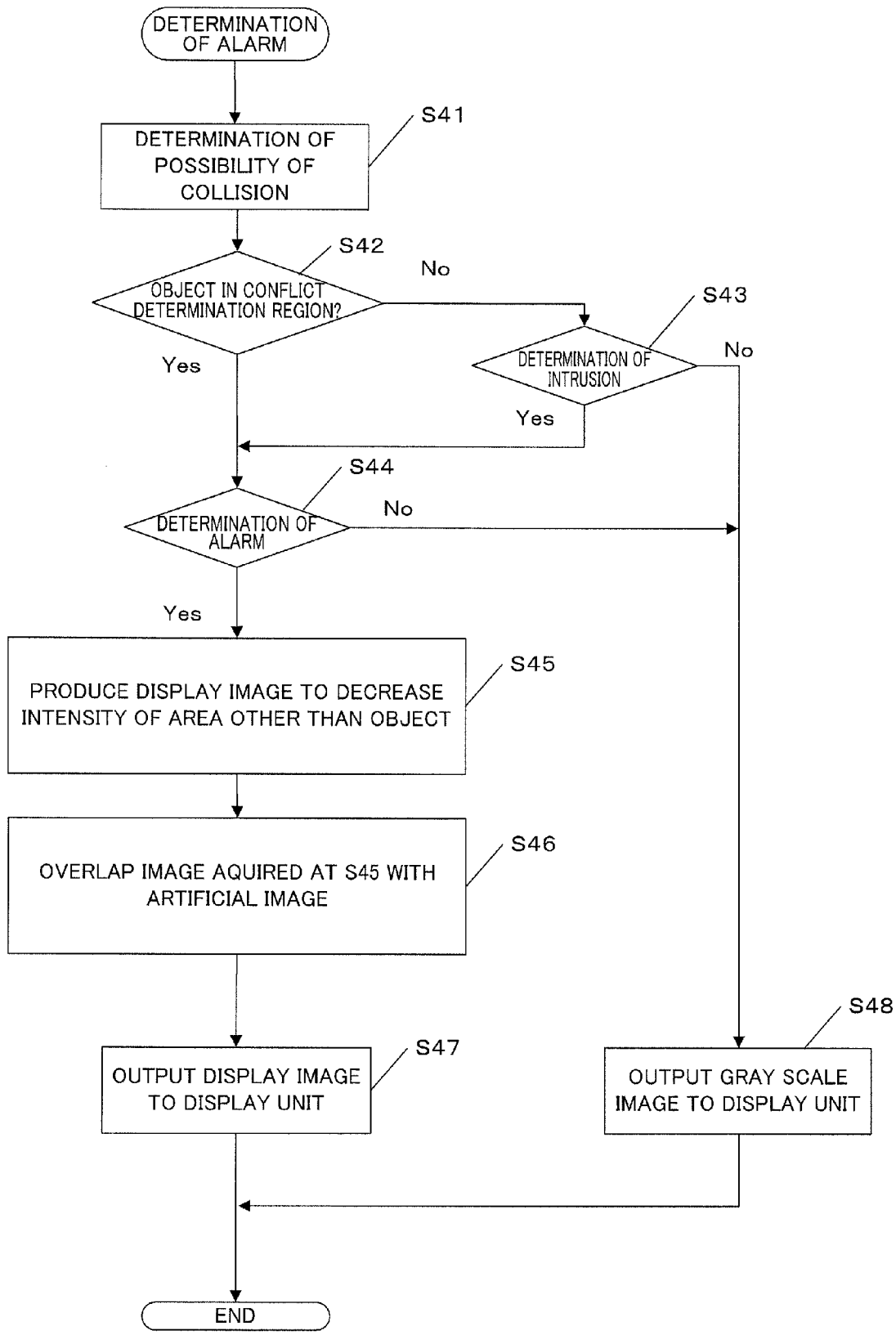
FIG. 11 is a flowchart showing an alarm decision process according to an embodiment of the present invention.

FIG. 11 is a flowchart of process of alarm decision to be performed in step S24 of FIG. 3. A difference from the process of FIG. 6 is an additional step S46. This will be described referring to FIG. 12.

Figure 12:
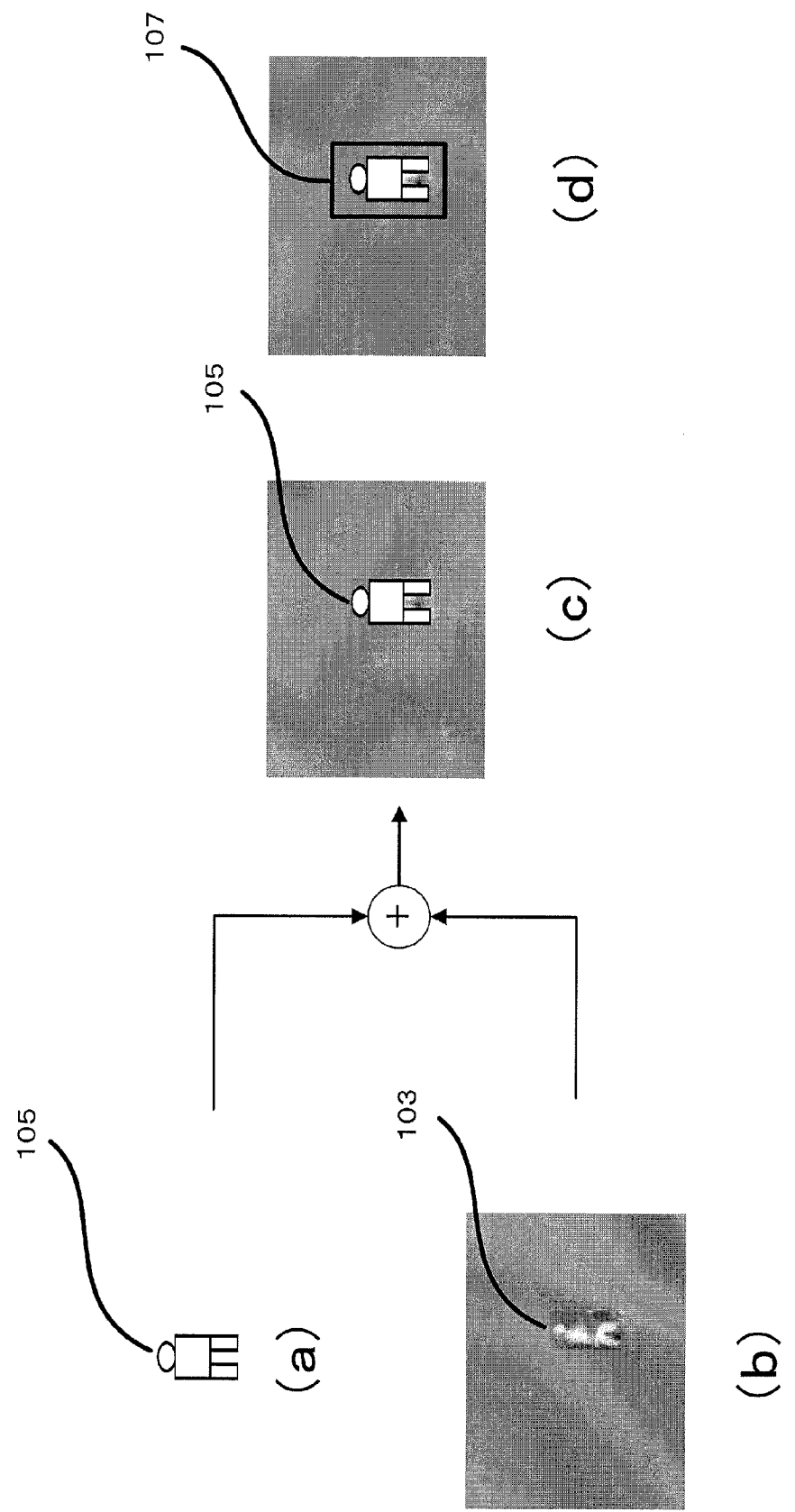
FIG. 12 is a drawing illustrating an alarm decision process according to another embodiment of the present invention.

In this embodiment, as shown in FIG. 12 (*a*), an artificial image of the object is stored in a storage device of image processing unit 2 in advance. The artificial image is an image of icon indicating an object. In this embodiment, icon 105 indicating a pedestrian may be stored assuming that the object is a pedestrian.

In step S46, the artificial image is read out from the storage device. The artificial image is overlapped on the position of the object in the image (as mentioned above, the intensity value of the object is not decreased) obtained in step S45. The image of object 103 obtained in step S45 is shown in FIG. 12 (*b*), which is the same as FIG. 10 (*b*). The artificial image 105 of FIG. 12 (*a*) is overlapped to the position of object 103 to produce an image shown in FIG. 10 (*c*). In step S47, the image with an overlapped artificial image is output onto the display device 4.

The artificial image is an image to be overlapped to the image to be displayed so that the object may be strongly visually distinguished from the other regions. Accordingly, preferably, the artificial image has a high intensity value and has a color (such as red or yellow) which draws the driver's attention. The intensity value of the artificial image is preferably set to a value higher by a predetermined value than the intensity of the other regions than the region of the object to produce a high contrast display image, the latter intensity being decreased in accordance with the process of step S45.

The intensity of the artificial image may be determined in advance or may be made variable. In the latter case, for example, the intensity (which may be an average intensity of pixels of the area) for the other regions than the object whose intensity has been decreased is obtained, to which a predetermined value may be added to produce an intensity for the artificial image. The artificial image of thus calculated intensity is overlapped to produce a display image.

In addition to the overlapping of the artificial image, as shown in FIG. 12 (d), an emphasizing display may be made by surrounding the artificial image with a frame 107. Preferably, the frame 107 is of a color and has a high intensity for display to draw the driver's attention.

Thus high-contrast image is displayed on the display device as if the artificial image indicating the position of the object is spotlighted. The artificial image is a sort of animation, and differs from features that are captured by imaging (real image of objects). Accordingly, the driver is made to recognize existence of the object needing attention. Further, the driver may be made to gaze forward, as the image the real object is hidden by the artificial image.

Living bodies include not only human beings but also animals, and animal may be detected as an object. Accordingly, an artificial image for a pedestrian and an artificial image for an animal may be created and stored in advance. In this case, a process for determining whether the object is a pedestrian or an animal is provided before step S435, for example. For the determination process, any suitable process may be provided before step S435. In the determination process, if the object is determined to be a pedestrian, then in step S46, the artificial image corresponding to the pedestrian is read out and overlapped to the object. If the object is determined to be an animal, then in step S46, the artificial image corresponding to an animal is read out and overlapped to the object. Thus, the driver may immediately recognize whether the object is a pedestrian or an animal.

In the above embodiment, the conflict determination region and the intrusion determination region are used for determining possibility of collision. The determination method is not limited to this mode. The method may be performed using any proper method of determination of possibility of collision.

In the above embodiment, the display device 4 uses a display unit (monitor) of a navigation system. In the present invention, a display device may be placed at left side or right side of the driver, as the driver may recognize the object quickly. On the other hand, any other display device may be used. The display mode of the present invention may be applied to a head up display as in a conventional way.

In the above embodiment, one or more far infrared cameras are used. However, any other cameras (for example, visible ray cameras) may be used.

Specific embodiments of the present invention have been described. However, the present invention should not be limited to the embodiments.

The invention claimed is:

1. A vehicle surroundings monitoring device having an imager that captures images of the surroundings of a vehicle with one or more cameras mounted to a vehicle, and an image processing unit comprising a processor and a memory, said image processing unit being configured to:
   acquire, via imaging with the imager, a gray scale image having an intensity corresponding to a temperature of an object;
   detect, from the gray scale image, an object in the surroundings of the vehicle;
   produce a display image to be displayed on a display unit mounted to the vehicle based on the gray scale image; and
   supply the display image to the display unit;
   wherein the image processing unit is further configured to:
      determine, for each of the objects, a possibility of collision with the vehicle, and determine the object having the high possibility of collision as a target object;
      determine whether a braking operation by a driver of the vehicle is in execution, and
      when the braking operation is determined to be in execution,
         calculate a deceleration of the vehicle;
         calculate, for each target object, a threshold value determined from a velocity of said each target object relative to the vehicle and a distance from the vehicle to said each target object;
         compare the calculated deceleration with each of the calculated thresholds, and
         decrease the intensity of the region other than the target object(s) in the gray scale image to produce said display image when the calculated deceleration is less than at least one of the calculated thresholds.

2. The device according to claim 1, wherein the display unit is provided at a position viewable from a driver of the vehicle, the position being apart in a vehicle-width direction by a predetermined distance from a line passing a center of a steering wheel of the vehicle and extending from the front to the rear of the vehicle.

3. The device according to claim 1, wherein the image processing unit
   produces the display image by further decreasing the intensity of the region of the object other than the target object(s) which gives the threshold value(s) greater than the calculated deceleration.

4. The device according to claim 1, wherein the image processing unit superimposes an artificial image for the target object at the position of the target object in the gray scale image, and supplies a superimposed image to the display unit.

5. The device according to claim 1, wherein the display unit is a monitor of a navigation system.

6. A vehicle surroundings monitoring device having one or more cameras mounted to a vehicle, a display unit and an image processing means, said image processing means comprising:
   means for capturing images of the surroundings of a vehicle with the one or more cameras;
   means for acquiring from the means for capturing images a gray scale image having an intensity corresponding to a temperature of an object;
   means for detecting, from the gray scale image, an object in the surroundings of the vehicle;
   means for producing a display image to be displayed on the display unit based on the gray scale image; and
   means for supplying the display image to the display unit;

wherein the means for detecting determines, for each of the objects, a possibility of collision with the vehicle, and determines the object having the high possibility of collision as a target object, wherein the means for detecting determines whether a braking operation by a driver of the vehicle is in execution, and calculates a deceleration of the vehicle when the braking operation is determined to be in execution, wherein the means for producing calculates, for each target object, a threshold value determined from a velocity of said each target object relative to the vehicle and a distance from the vehicle to said each target object, and compares the calculated deceleration with each of the calculated thresholds, and wherein the means for producing a display image decreases the intensity of the region other than the target object(s) in the gray scale image to produce said display image when the calculated deceleration is less than at least one of the calculated thresholds.

7. The device according to claim 6, wherein the display unit is provided at a position viewable from a driver of the vehicle, the position being apart in a vehicle-width direction by a predetermined distance from a line passing a center of a steering wheel of the vehicle and extending from the front to the rear of the vehicle.

8. The device according to claim 6, wherein
the means for producing a display image produces the display image by further decreasing the intensity of the region of the object other than the target object(s) which gives the threshold value(s) greater than the calculated deceleration.

9. The device according to claim 6, wherein the image processing means superimposes an artificial image for the target object at the position of the target object in the gray scale image, and supplies a superimposed image to the display unit.

10. The device according to claim 6, wherein the display unit is a monitor of a navigation system.

11. A method for monitoring surroundings of a vehicle having one or more cameras mounted the a vehicle, a display unit and an image processing unit, the method being performed by said image processing unit and comprising:

capturing images of the surroundings of a vehicle with the one or more cameras;

acquiring from the means for capturing images a gray scale image having an intensity corresponding to a temperature of an object;

detecting, from the gray scale image, objects in the surroundings of the vehicle;

producing a display image to be displayed on the display unit based on the gray scale image; and supplying the display image to the display unit;

wherein the method further comprises:

determining, for each of the objects, a possibility of collision with the vehicle, and determining the object having the high possibility of collision as a target object; and determining whether a braking operation by a driver of the vehicle is in execution, and calculating a deceleration of the vehicle when the braking operation is determined to be in execution, and wherein, in the step of producing of a display image, for each target object, a threshold value determined from a velocity of said each target object relative to the vehicle and a distance from the vehicle to said each target object is calculated, and the calculated deceleration is compared with each of the calculated thresholds, and said display image is produced by decreasing the intensity of the region other than the target object(s) in the gray scale image when the calculated deceleration is less than at least one of the calculated thresholds.

12. The method according to claim 11, wherein the display unit is provided at a position viewable from a driver of the vehicle, the position being apart in a vehicle-width direction by a predetermined distance from a line passing a center of a steering wheel of the vehicle and extending from the front to the rear of the vehicle.

13. The method according to claim 11,
wherein, in the step of producing a display image, the display image is produced by further decreasing the intensity of the region of the object other than the target object(s) which gives the threshold value(s) greater than the calculated deceleration.

14. The method according to claim 11, further comprising:
superimposing an artificial image for the target object at the position of the target object in the gray scale image, and supplying a superimposed image to the display unit.

15. The method according to claim 11, wherein the display unit is a monitor of a navigation system.

* * * * *